United States Patent [19]

Vanzo

[11] Patent Number: 4,910,963
[45] Date of Patent: Mar. 27, 1990

[54] SOLAR ENERGY PROCESS

[76] Inventor: Gordon F. Vanzo, 12066 Boston Post, Livonia, Mich. 48150

[21] Appl. No.: 273,901

[22] Filed: Nov. 21, 1988

[51] Int. Cl.$^4$ .............................................. F01K 21/00
[52] U.S. Cl. ..................... 60/641.8; 60/648; 60/670; 60/721; 62/52.1; 62/50.1
[58] Field of Search ........................ 60/641.8–641.15, 60/652, 659, 651, 670, 671, 721, 648; 62/7, 52, 55; 290/1 R

[56] References Cited

U.S. PATENT DOCUMENTS

| 1,897,165 | 2/1933 | Endacott | 62/55 |
|---|---|---|---|
| 2,036,613 | 4/1936 | Stuart | 290/1 R |
| 3,070,703 | 12/1962 | Podolny | 60/641.8 |
| 3,293,850 | 12/1966 | Morrison | 60/648 |
| 3,965,362 | 6/1976 | Harvey | 60/648 X |
| 4,370,559 | 1/1983 | Langley, Jr. | 290/1 R |
| 4,551,980 | 11/1985 | Bronicki | 290/1 R |

Primary Examiner—Allen M. Ostrager
Attorney, Agent, or Firm—Charles W. Chandler

[57] ABSTRACT

Solar energy produces electric current which powers an electrolysis unit and a cryogenic cooling unit. Gaseous hydrogen and gaseous oxygen are liquified in the cooling unit and pumped into cryogenic transport vehicles (railroad cars or highway trailers). An end user of the liquids has a boiler and vaporizing equipment for burning the reactants ($H_2$ and $O_2$) to produce electrical energy or mechanical power. The broiler may be part of a stationary electrical facility power plant or part of a vehicle propulsion system.

9 Claims, 2 Drawing Sheets

SOLAR ENERGY PROCESS

BACKGROUND OF THE INVENTION

This invention relates to systems for converting solar energy to electrical energy or mechanical energy. The invention has potential use by large electrical utility companies or private power plant owners. It could also be used by automotive vehicle service station companies to provide an alternative fuel to gasoline or diesel fuel.

The invention contemplates a large array of photovoltaic cells (solar cells) covering several acres of land to generate direct current. Some of the generated current is supplied to an electrolysis unit that converts liquid water into gaseous hydrogen and gaseous oxygen. Some of the generated current is sent to a cryogenic cooling unit that liquidifies the oxygen and hydrogen. The two separate liquids are pumped into separate tanks on transport vehicles (that can be either railroad cars or trailer-type road vehicles).

The use of transport vehicles for the liquid oxygen and liquid hydrogen is advantageous in that it enables the solar cells to be located in a rural area remote from the end use point. Acreage for the solar cells can be mountainous land or desert land that is relatively economical to acquire, but is nevertheless well suited to the attainment of high solar cell operation efficiencies (i.e. land that has predominately sunny cloudless days, and a high sun orbit). By using low cost land for the solar cells it should be possible to reduce the capital expenditure associated with the production of liquid oxygen and liquid hydrogen.

In one form of the invention, the transport vehicles deliver the liquid oxygen and liquid hydrogen to a geographical site that includes a steam boiler, steam turbine and turbine-driven electric generator. The liquid oxygen and liquid hydrogen are burned in the boiler to heat (produce) steam, which is circulated through the turbine. The turbine powers the electrical generator, which produces electricity as the end product.

A major advantage of the proposed system is the fact that liquid oxygen and liquid hydrogen can be produced from solar energy (using a suitable water supply) at one geographical site selected for the climate (exposure to solar energy) and low acquisition cost; whereas the boiler, turbine, and electric generator can be located at a second geographical site selected for other factors, e.g. a site in near proximity to electrical customers, and or a site already having the necessary boiler, turbine and electric generator. The purpose in liquefying the oxygen and hydrogen is to reduce the transport volume so that the oxygen and hydrogen can be economically transported from one geographical site to another site.

Prior to this invention, others have suggested various process steps used in the practice of my invention.

U.S. Pat. No. 3,459,953 which issued to W. L. Hughes, et al, discloses an electrical production system wherein an electrolysis unit 16 supplies gaseous hydrogen and gaseous oxygen to storage devices 20 and 22. The gases are burned in a burner 24 that produces steam for powering a steam tubrine 32. Mechanical power is thus delivered to an electric generator 36. Apparently, the entire system (apparatus) is located at one geographical site.

U.S. Pat. No. 4,161,657 discloses an apparatus that is powered by solar rays to produce an electric current. The current is applied to an electrolysis unit which converts liquid water into gaseous hydrogen and oxygen.

U.S. Pat. No. 4,227,374 which issued to A. Oxley shows an energy storage system that includes a Stirling refrigerator 19 driven by a steam turbine 12 to produce liquid oxygen. The oxygen is stored in a tank 21 which connects to a heat pipe 31 and Stirling engine 27.

U.S. Pat. No. 4,650,544 which issued to Roy Gordon relates to an apparatus that uses solar rays to convert water into gaseous hydrogen and oxygen. A specially constructed laminated sheet structure is immersed in an electrolyte so that solar energy impinging on the sheet surface generates an output voltage that electrolytically decomposes water into hydrogen and oxygen.

The various known prior art patents individually show isolated features used in my invention. My proposed system, as a single entity, is believed to be novel.

SUMMARY OF THE INVENTION

One object of my invention is to provide an energy conversion system that uses low cost solar energy.

Another object is to provide an energy conversion system wherein low cost solar-generated electrical energy is used to power an electrolysis unit and also to power a cryogenic cooling unit. The electrical energy is used at its point of generation; also, the electrical energy is produced from free solar energy. Therefore the costs for operating the electrolysis unit and the cryogenic cooling unit are relatively low.

A further object of the invention is to provide a low cost method of transporting oxygen and hydrogen from one geographical site to another geographical site. The oxygen and hydrogen are cryogenically cooled to the liquid state and transported in separate tank cars. The cars may be railroad cars or highway trailers. Volume reduction associated with the cryogenic cooling enables transportation costs to be kept relatively low.

A general object of my invention is to provide an energy conversion system wherein two separate geographical sites are used. In a first site, liquid hydrogen and liquid oxygen are produced. In a second site, the oxygen and hydrogen are burned to produce steam (heat) for generating electric power. The first site can be a rural site that comprises several acres of land purchased at relatively low cost. The second site can be an urban site having a pre-existing boiler, steam turbine and electric generator.

The invention enables solar energy collection systems to be combined with conventional turbo-electric power systems, thus utilizing advantages inherent in both types of systems.

A major object of the invention is to enable pollution-free solar energy to effectively power an existing steam turbine and associated electric generator. The existing turbine and electric generator can be left intact at an urban site without disturbing the apparatus. The solar collection apparatus can be erected and operated at a remote rural site where extensive acreage is available at relatively low acquisition cost. The rural site can be selected with climatic (solar) factors in mind.

The invention permits an existing boiler-turbine-generator apparatus to be operated economically with low fuel expense (relatively free solar energy). The invention avoids pollution problems, and/or the depletion of natural resources (coal and oil), and/or costs associated with ash disposal or radioactive waste disposal.

Another object is to provide a system in which liquid hydrogen or oxygen is used to cool steam into condensate being discharged from a steam turbine.

Another object is to use the exhaust steam of a steam turbine for vaporizing liquid hydrogen and liquid oxygen.

THE DRAWINGS

DESCRIPTION OF A PREFERRED FORM OF THE INVENTION

Figure 1:
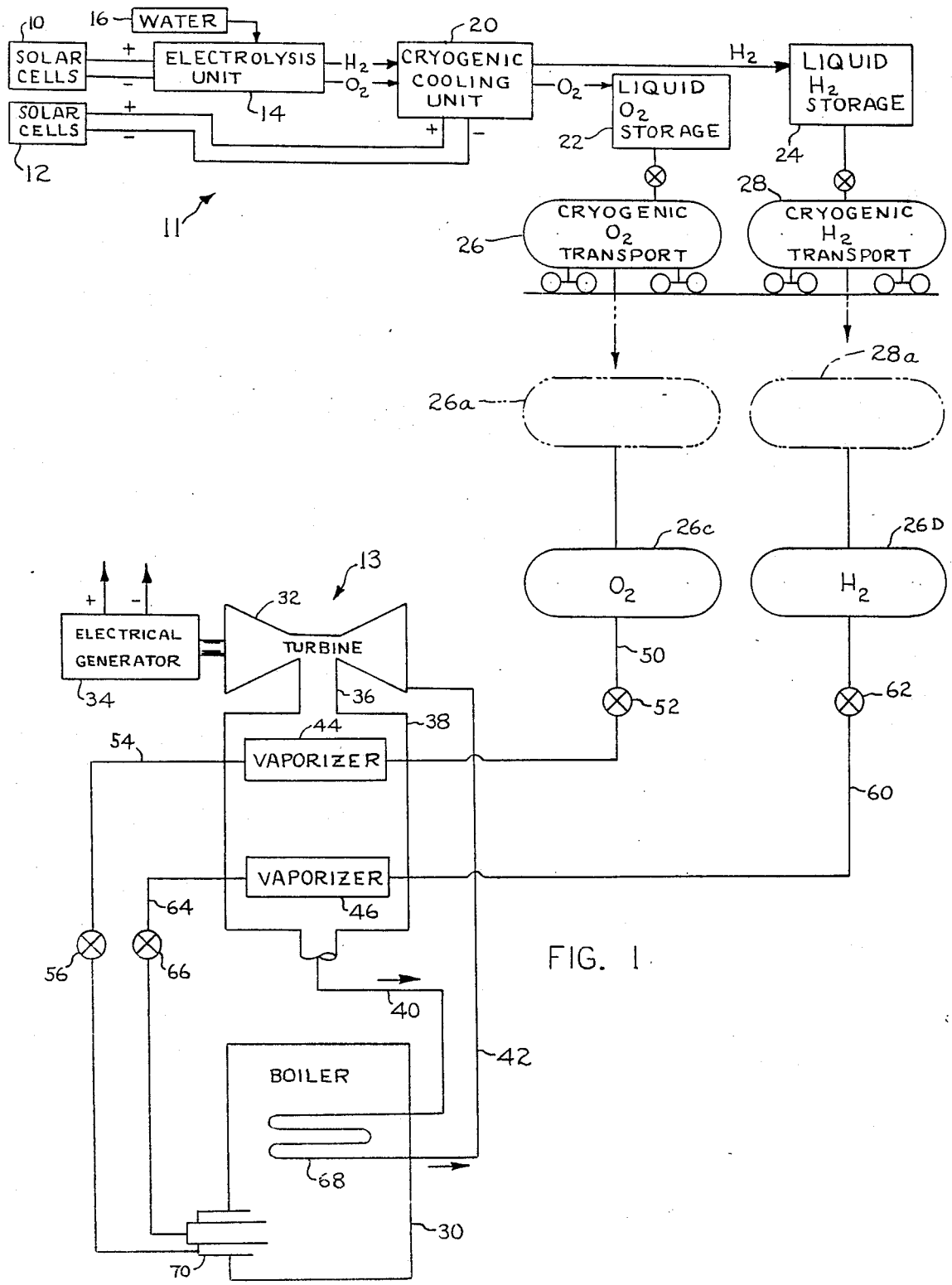
FIG. 1 is a diagrammatic illustration of an apparatus embodying my invention.

FIG. 1 shows first and second arrays of solar cells 10 and 12. In practice, large numbers of such cells would be used in a rural site 11 covering several acres. The electrical output of cells 10 is applied to an electrolysis unit 14 supplied with feed water from a water source 16. Gaseous hydrogen and gaseous oxygen are formed in the electrolysis unit.

Separate streams of hydrogen gas and oxygen gas are directed from electrolysis unit 14 to an electrically-powered cryogenic cooling unit 20. Electrical power for the cooling unit is supplied by current generated in solar cells 12. Liquid oxygen is pumped from cooling unit 20 to a temporary storage tank 22. Liquid hydrogen is pumped from cooling unit 20 to a temporary storage tank 24.

A separate cryogenic transport vehicle 26 or 28 is provided for each liquid, oxygen or hydrogen. Each vehicle can be a tank mounted on a railroad flat car or a tank mounted on the trailer section of a highway tractor-trailer combination. Detachable liquid connections are provided at each vehicle, 26 or 28, whereby the vehicle can be filled with liquid oxygen or liquid hydrogen, after which the vehicle can be moved from solar cell site 11 to another site designated by numeral 13.

Dashed lines 26a and 28a in FIG. 1 show vehicles 26 and 28 at a second site 13 remote from the acreage containing solar cells 10 and 12. The second site may be several miles from the first site occupied by solar cells 10 and 12. Ideally, the arrays of cells 10 and 12 are located in a rural area where acreage can be acquired at low cost, and where the days are predominately cloud-free and sun-filled. A high sun orbit is preferred. The second site 13 contains a boiler 30, steam turbine 32, and turbine-driven generator 34. This second site is selected primarily on the basis of its proximity to suitable electrical power distribution lines and customer locations.

Boiler 30, turbine 32 and generator 34 can be pre-existing mechanisms already in service. The invention contemplates a retrofit type of installation wherein an oil-fired boiler, gas-fired boiler or coal-fired boiler is retrofitted to burn gaseous hydrogen. The gaseous hydrogen is delivered from remote rural site 11 to boiler site 13 via tank truck 28. Oxygen for the burning process is delivered to the boiler site via tank truck 26.

After arrival at boiler site 13, the liquid transport vehicles are connected to short-term separate storage facilities 26C and 26D.

Turbine 32 is of the type which employs super-heated steam from boiler 30 and then discharges the exhausted steam through a conduit 36 to a condenser 38. The steam is condensed in condenser 38 and then the condensate in the form of water is discharged at a relatively low pressure such as 1 or 2 psia through a condensate conduit 40 to the boiler where it is then super-heated steam and that steam delivered through a conduit 42 to the turbine. A pair of heat exchangers or vaporizers 44 and 46 are mounted in the condenser to condense the hot steam to form water. The liquid oxygen is delivered from tank 26C to a conduit 50 and a control valve 52 to the vaporizer where vaporizer 44 where the super-cooled liquid oxygen passes in a heat exchange relationship to the steam being exhausted from the turbine. This process converts the liquid oxygen into a vapor stage. The oxygen in a gas form is discharged through a conduit 54 to the boiler 30. A control valve 56 is connected in conduit 54 for controlling the gas delivery to the boiler.

Similarly, the liquid hydrogen is delivered from temporary storage tank 26D through a conduit 60 to vaporizer 46. Control valve 62 is connected in conduit 60 for controlling the flow rate to the vaporizer. The liquid hydrogen also passes in heat exchange relationship to the steam being exhausted into the condenser from the turbine and cools the steam. In the process the liquid hydrogen forms a vapor or gas which is discharged through a conduit 64 to the boiler. A control valve mechanism 66 provides means for controlling the flow rate of the gas to the boiler.

Boiler 30 includes concentric mixing tubes 68 and 70 for causing the gaseous oxygen to mix with the gaseous hydrogen as the two gases enter the boiler combustion chamber. An electric igniter is provided to initiate combustion.

Valve mechanisms 56 and 66 may be adjusted to vary the relative flows of oxygen and hydrogen, whereby the gases in tubes 56 and 66 are in stoichiometric amounts suitable for burning. The burning action applies heat to a heat exchanger 68 in boiler 30. Water within the heat exchanger tubes turns to steam which exits from the boiler through steam line 42.

High pressure steam from line 42 drives turbine 32, which delivers mechanical power to generator 34.

The FIG. 1 system uses solar energy to provide electrical energy at a geographical location 11 conducive to efficient operation of solar cells 10 and 12. Preferred sites are in rural areas where land acquisition costs are low. The electrical output of solar cells 10 and 12 is used immediately at its point of generation to power electrolysis unit 14 and cooling unit 20. At this point in the cycle the electrical power is obtained at very low cost (from solar radiation); therefore the costs for operating the electrolysis unit and the cooling unit are relatively low.

There is a cost factor in transporting the oxygen and hydrogen reactants from site 11 to site 13. However, since the oxygen and hydrogen are in liquid form during the transport operation, it is possible to carry large quantities of each reactant in a given transport vehicle. In terms of energy content it is believed that the transportation step will not add significantly to the overall cost of producing electrical energy at generator 34. In certain circumstances, the cryogenic process may be eliminated and gaseous $H_2$ and $O_2$ transported within pressurized pipelines.

Figure 2:
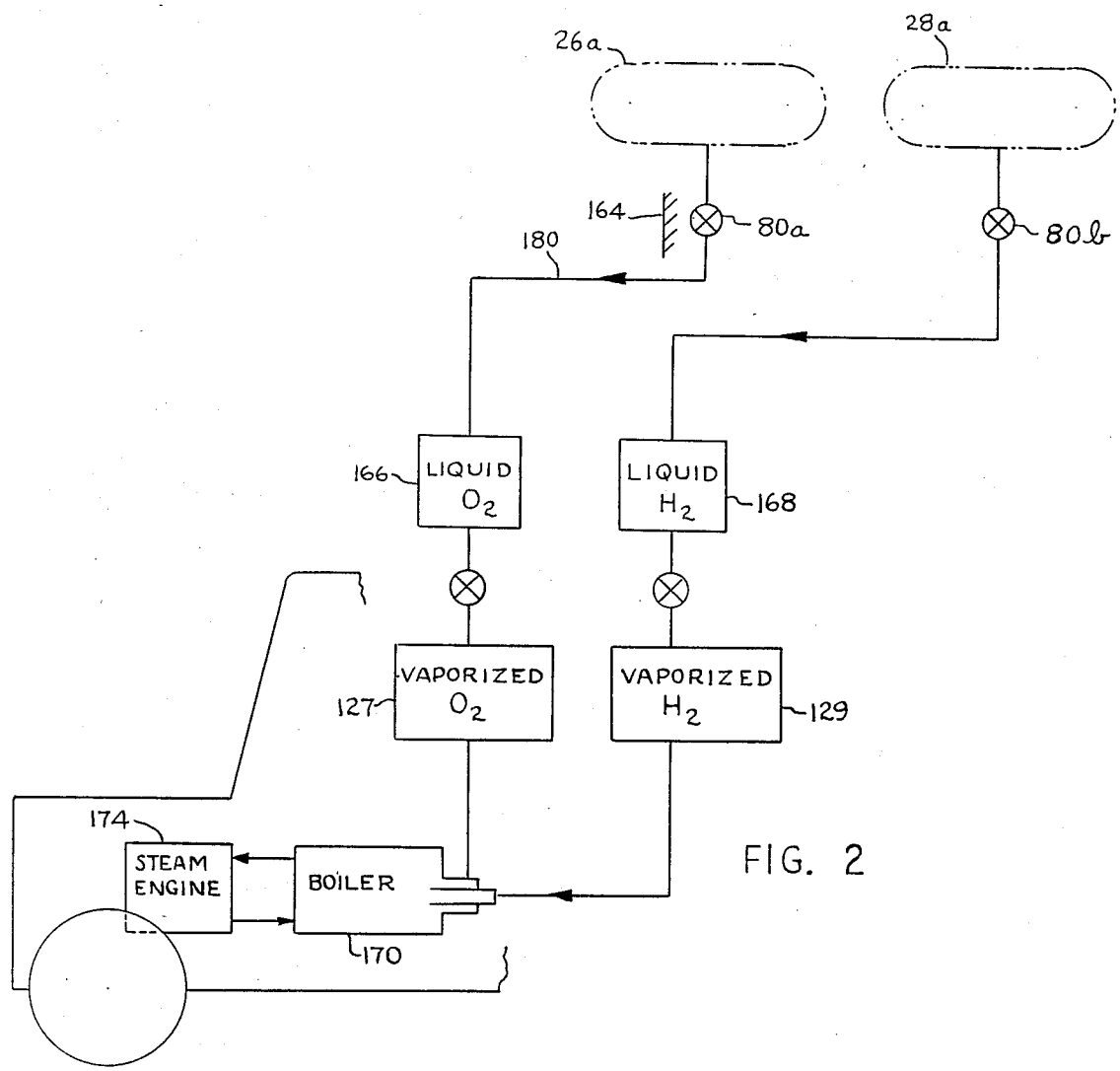
FIG. 2 is a diagrammatic illustration fragmentarily showing a second form of my invention.

FIG. 2 illustrates features of a system designed to provide liquid hydrogen and liquid oxygen to automotive vehicles or ships for vehicle propulsion purposes. Each vehicle using the system would be modified to have a boiler and steam engine on-board, as well as tanks for containing the liquid reactants.

The contemplated system includes a solar facility for producing the liquid oxygen and liquid hydrogen. Liquid transport vehicles would be dispatched from the facility to various filling stations where individual vehicle owners would fill their vehicles with the liquid reactants. The system would be somewhat similar to the present day gasoline distribution system wherein gasoline is manufactured (refined) at a refinery and distributed to various filling stations located remote from the refinery.

FIG. 2 illustrates some features of the contemplated system. The apparatus at site 11 (not shown in FIG. 2) is similar to the apparatus shown in FIG. 1. FIG. 2 shows two transport vehicles at locations 26A and 28A, i.e. at a "service station" site remote from the oxygen-hydrogen production site.

The FIG. 2 system is used to supply liquid oxygen and liquid hydrogen to automotive vehicles, e.g. large trucks, busses, ships, etc. The vehicles are equipped with on-board liquid tanks 166 and 168 for the oxygen and hydrogen. Liquid oxygen and liquid hydrogen are pumped into each vehicle from tanks 26A and 28A located at a filling station designated by numeral 164. Transport vehicles 26 and 28 can remain at the filling station until they are required to be returned to site 11 for refill purposes.

Each automotive vehicle or ship will be equipped with two on-board liquid tanks 166 and 168, two vaporizer units 127 and 129, a mixing means at 142, 144, a boiler 170, and a steam engine 174. Numerals 80A and 80B designate disconnectable liquid connections between the stationary liquid supply tanks at 26A, 28A and the vehicle on-board equipment. Engine 174 is used for vehicle propulsion purposes.

Boiler 170 is a relatively small device when used for vehicle propulsion purposes. The boiler is not required to have a heat exchanger corresponding to heat exchanger 68. Instead the steam product formed by the combustion of hydrogen can be circulated directly through steam engine 174. A pressure-relief valve on boiler 170 relieves excessive pressures that might otherwise develop. A condenser is provided in the condensate return line from engine 174 to boiler 170. All existing steam generation means are possible.

The vehicle propulsion system shown in FIG. 2 is intended to be a pollution-free alternative to conventional vehicle power plants using gasoline or diesel fuels. In a broad sense the system of FIG. 2 is similar to the FIG. 1 system in that solar energy is used to produce liquid hydrogen and liquid oxygen. In both systems the liquid reactants are transported from the production facility (site 11) to the user facility. In the FIG. 1 system the user facility includes a boiler, steam turbine and electric generator. In the FIG. 2 system the user facility is a filling station for supplying fuel to automotive customers.

The drawings show particular forms and arrangements that the invention might take. Other forms are possible.

I claim:

1. In combination comprising:
an array of solar cells at a first geographical site operable to generate an electric current;
an electrically-operated electrolysis unit operable to convert liquid water into gaseous hydrogen and gaseous oxygen; an electrical connection between the solar cells and the electrolysis unit, whereby current generated by the solar cells is used to power the electrolysis unit;
a first electrically-operated cryogenic cooling means for converting the gaseous hydrogen to the liquid state, and means for transporting the gaseous hydrogen from the electrolysis unit to the first cryogenic cooling means;
a second electrically-operated cryogenic cooling means for converting the gaseous oxygen to the liquid state, and means for transporting the gaseous oxygen from the electrolysis unit to the second cryogenic cooling means;
electrical connections between the solar cells and each of said cryogenic cooling means whereby current generated by the solar cells is used to power each cryogenic cooling means;
a first transport vehicle having a tank thereon for transporting liquid hydrogen from the first geographical site to a second geographical site;
a second transport vehicle having a tank thereon for transporting liquid oxygen from the first geographical site to the second geographical site;
means at the second geographical site connectable to each respective transport vehicle for vaporizing the liquid hydrogen and liquid oxygen;
means at the second geographical site for mixing the vaporized hydrogen and oxygen in stoichiometric amounts suitable for combustion; a boiler; and
means for introducing the combustion mixture to the boiler whereby the mixture is burned to produce steam.

2. The combination of claim 1, wherein the liquid vaporizing means comprises means for transferring heat from the boiler-produced steam to the liquid hydrogen and liquid oxygen.

3. The combination of claim 1, wherein the first geographical site is a rural site, and the second site is an urban site.

4. The combination of claim 1, and further comprising a steam engine, and means for circulating steam from the boiler through the engine.

5. The combination of claim 1, and further comprising a heat exchanger located within the boiler, and means for passing water through the heat exchanger.

6. In combination comprising:
an array of solar cells operable to generate an electric current;
an electrically-operated electrolysis unit operable to convert liquid water into gaseous hydrogen and gaseous oxygen; an electrical connection between the solar cells and the electrolysis unit, whereby current generated by the solar cells is used to power the electrolysis unit;
a first electrically-operated cryogenic cooling means for converting the gaseous hydrogen to the liquid state, and means for transporting the gaseous hydrogen from the electrolysis unit to the first cryogenic cooling means;
a second electrically-operated cryogenic cooling means for converting the gaseous oxygen to the liquid state, and means for transporting the gaseous oxygen from the electrolysis unit to the second cryogenic cooling means;
electrical connections between the solar cells and each of said cryogenic cooling means, whereby current generated by the solar cells is used to power each of said cryogenic cooling means;
a first tank for containing the liquid hydrogen;

a second tank for containing the liquid oxygen;
a boiler;
means connectable to the first tank for vaporizing the liquid hydrogen;
means connectable to the second tank for vaporizing the liquid oxygen;
means for mixing the vaporized hydrogen and vaporized oxygen in stoichiometric amounts suitable for conbustion; and
means for introducing the combustive mixture to the boiler, whereby the mixture is burned in the boiler to produce steam.

7. The combination of claim 6, and further comprising a first railroad car supporting the first tank, and a second railroad car supporting the second tank, whereby the electrolysis unit and boiler can be located at different geographical sites.

8. The combination of claim 7, and further comprising a fluid circuit that includes a heat exchanger located within the boiler, a steam turbine and means or circulating steam through the heat exchanger and the steam turbine.

9. The combination of claim 8, including a steam engine, means for delivering the steam from the boiler to the engine to drive same, a condenser connected to the engine for receiving steam being discharged therefrom, heat exchanger means in the condenser for passing the liquid hydrogen and/or liquid oxygen in heat exchange relationship with the steam to cool same as the hydrogen and oxygen are being vaporized, and means for delivering the vaporized hydrogen and oxygen to the boiler for combustion therein.

* * * * *